United States Patent
de Saint Leger et al.

(10) Patent No.: US 11,127,027 B2
(45) Date of Patent: Sep. 21, 2021

(54) SYSTEM AND METHOD FOR MEASURING SOCIAL INFLUENCE OF A BRAND FOR IMPROVING THE BRAND'S PERFORMANCE

(71) Applicant: ENGAGEMENT LABS INC./LABORATOIRES ENGAGEMENT INC., Montreal (CA)

(72) Inventors: Cédric de Saint Leger, Paris (FR); Ed Keller, Hastings on Hudson, NY (US); William Bradford Fay, Princeton, NJ (US)

(73) Assignee: ENGAGEMENT LABS INC./LABORATORIES ENGAGEMENT INC., L'lle-Bizard (CA)

( * ) Notice: Subject to any disclaimer, the term of this patent is extended or adjusted under 35 U.S.C. 154(b) by 559 days.

(21) Appl. No.: 15/746,731

(22) PCT Filed: Dec. 21, 2017

(86) PCT No.: PCT/CA2017/051578
§ 371 (c)(1),
(2) Date: Jan. 22, 2018

(87) PCT Pub. No.: WO2018/112651
PCT Pub. Date: Jun. 28, 2018

(65) Prior Publication Data
US 2020/0090196 A1    Mar. 19, 2020

Related U.S. Application Data

(60) Provisional application No. 62/437,342, filed on Dec. 21, 2016.

(51) Int. Cl.
*G06Q 30/02* (2012.01)
*G06N 20/00* (2019.01)

(52) U.S. Cl.
CPC ......... *G06Q 30/0203* (2013.01); *G06N 20/00* (2019.01); *G06Q 30/0201* (2013.01); *G06Q 30/0246* (2013.01)

(58) Field of Classification Search
CPC .......... G06Q 30/0203; G06Q 30/0201; G06Q 30/0246; G06N 20/00
(Continued)

(56) References Cited

U.S. PATENT DOCUMENTS 6,996,560 B1 *   2/2006   Choi ..................... G06Q 30/02
7,685,021 B2 *   3/2010   Kumar .................. G06Q 30/06
                                                              705/26.2
(Continued)

FOREIGN PATENT DOCUMENTS

WO     2005079368 A2     9/2005

OTHER PUBLICATIONS

Antonino "Measuring Performance Metrics: Techniques and Tools", Dec. 2008; Dependability Metrics, LNCS 4909, pp. 226-232. (Year: 2008).*

(Continued)

*Primary Examiner* — Romain Jeanty
(74) *Attorney, Agent, or Firm* — Talor English Duma LLP

(57) ABSTRACT

System and method for measuring the performance of brands across online and offline consumer conversations. Raw conversational data of online and offline conversations is received and analyzed using proprietary algorithms to extract, for each type of data (online and offline), relevant metrics that reflect the performance of the brand. In a non-limiting example, these metrics include: volume, sentiment, brand sharing and social influence. One of the problems with using raw data is the extreme volatility that will cause the results to sharply vary between a week and the (Continued)

other depending on the most recent activity or the lack of activity. To solve this problem, the embodiments compute for each metric a moving average (MA) formula specific to that metric to reduce the volatility of the results. The formula is computed so that the metric values produced by the formula would have the best/most correlation with factual data/business outcomes (e.g. sales/sale figures, stock price, purchase or dumping of stocks etc.).

20 Claims, 6 Drawing Sheets

(58) Field of Classification Search
USPC .................................................. 705/7.11–7.42
See application file for complete search history.

(56) References Cited

U.S. PATENT DOCUMENTS

| | | | | |
|---|---|---|---|---|
| 2002/0147516 | A1* | 10/2002 | Jones | G06Q 99/00 |
| | | | | 700/97 |
| 2003/0069822 | A1* | 4/2003 | Ito | G06Q 40/02 |
| | | | | 705/36 R |
| 2003/0163471 | A1* | 8/2003 | Shah | G06Q 30/02 |
| 2005/0209909 | A1 | 9/2005 | Dull | |
| 2006/0085255 | A1* | 4/2006 | Hastings | G06Q 30/02 |
| | | | | 705/14.4 |
| 2006/0200408 | A1* | 9/2006 | Gryce | G06Q 20/102 |
| | | | | 705/40 |
| 2007/0174105 | A1* | 7/2007 | Abe | G06Q 10/0637 |
| | | | | 705/7.29 |
| 2008/0288889 | A1* | 11/2008 | Hunt | G06Q 30/02 |
| | | | | 715/810 |
| 2009/0006156 | A1* | 1/2009 | Hunt | G06Q 30/02 |
| | | | | 705/7.11 |
| 2011/0202388 | A1* | 8/2011 | Luby | G06Q 10/0637 |
| | | | | 705/7.32 |
| 2012/0179476 | A1* | 7/2012 | Muncy | G06Q 30/0207 |
| | | | | 705/1.1 |
| 2012/0278253 | A1 | 11/2012 | Gahlot et al. | |
| 2013/0080208 | A1 | 3/2013 | Wang et al. | |
| 2014/0279811 | A1 | 9/2014 | Michels et al. | |
| 2015/0032514 | A1* | 1/2015 | Cristol | G06Q 30/02 |
| | | | | 705/7.38 |
| 2016/0042366 | A1 | 2/2016 | Lux et al. | |
| 2017/0011413 | A1* | 1/2017 | Treiser | G06Q 30/02 |

OTHER PUBLICATIONS

Ahm Shamsuzzoha et al. "Dashboard User Interface for Measuring Performance Metrics: Concept from Virtual Factory Approach", Jan. 2014; Proceedings of the 2014 International Conference on Industrial Engineering and Operations Management, pp. 124-133. (Year: 2014).*

Melike "Perception Versus Reality: A Comprehensive Examination of Brand Quality Dynamics, Market Signaling, and Performance Interfaces", Dec. 2009, ProQuest LLC, pp. 1-168 (Year: 2009).*

WIPO; International Search Report for International Application No. PCT/CA2017/051578 dated Jan. 2015, 6 pages.

Cedric de Saint Leger; Extended European Search Report for EP Application 17884276.1, filed Jan. 22, 2018; dated May 11, 2020; 9 pages.

\* cited by examiner

| Metric | Current Plan (for Ref.) | Moving Average Plan - US | Moving Average Plan - Custom US | Moving Average Plan - TotalSocial GB | Moving Average Plan - Custom GB |
|---|---|---|---|---|---|
| Offline Volume | 4 Week Rolling | 4 Weeks (50%), 8 Weeks (50%) | 4 Weeks (50%), 8 Weeks (50%) | 4 Weeks (50%), 8 Weeks (50%) | 4 Weeks (50%), 8 Weeks (50%) |
| Offline Sentiment* | 26 Week Rolling | 4 Weeks (25%), 12 Weeks (25%), 26 Weeks (50%) | 4 Weeks (100%) | 4 Weeks (25%), 12 Weeks (25%), 26 Weeks (50%) | 4 Weeks (100%) |
| Offline Brand Sharing** | 52 Week Rolling | 8 Weeks (40%), 52 Weeks (60%) | 4 Weeks (100%) | 8 Weeks (40%), 52 Weeks (60%) | 4 Weeks (100%) |
| Offline Influence** | 52 Week Rolling | 8 Weeks (40%), 52 Weeks (60%) | 4 Weeks (40%), 52 Weeks (60%) | 8 Weeks (40%), 52 Weeks (60%) | 4 Weeks (40%), 52 Weeks (60%) |
| Online Volume | 4 Week Rolling | 4 Weeks (50%), 8 Weeks (50%) | 4 Weeks (50%), 8 Weeks (50%) | 4 Weeks (50%), 8 Weeks (50%) | 4 Weeks (50%), 8 Weeks (50%) |
| Online Sentiment | 4 Week Rolling | 4 Weeks (50%), 8 Weeks (50%) | 4 Weeks (50%), 8 Weeks (50%) | 4 Weeks (50%), 8 Weeks (50%) | 4 Weeks (50%), 8 Weeks (50%) |
| Online Brand Sharing | 4 Week Rolling | 4 Weeks (33%), 8 Weeks (33%), 12 Weeks (33%) | 4 Weeks (33%), 8 Weeks (33%), 12 Weeks (33%) | 4 Weeks (33%), 8 Weeks (33%), 12 Weeks (33%) | 4 Weeks (33%), 8 Weeks (33%), 12 Weeks (33%) |
| Online Influence | 4 Week Rolling | 4 Weeks (33%), 8 Weeks (33%), 12 Weeks (33%) | 4 Weeks (33%), 8 Weeks (33%), 12 Weeks (33%) | 4 Weeks (33%), 8 Weeks (33%), 12 Weeks (33%) | 4 Weeks (33%), 8 Weeks (33%), 12 Weeks (33%) |

FIG. 2

| Metric | Weight - TotalSocial US, UK | Weight - Custom US | Weight - TotalSocial GB | Weight - Custom GB |
|---|---|---|---|---|
| *Offline* | *52%* | *52%* | *52%* | *52%* |
| Offline Volume | 16% | 16% | 16% | 16% |
| Offline Sentiment | 17% | 17% | 17% | 17% |
| Offline Brand Sharing | 9% | 9% | 9% | 9% |
| Offline Influence | 10% | 10% | 10% | 10% |
| *Online* | *48%* | *48%* | *48%* | *48%* |
| Online Volume | 13% | 13% | 13% | 13% |
| Online Sentiment | 12% | 12% | 12% | 12% |
| Online Brand Sharing | 11% | 11% | 11% | 11% |
| Online Influence | 12% | 12% | 12% | 12% |

FIG. 3

SYSTEM AND METHOD FOR MEASURING SOCIAL INFLUENCE OF A BRAND FOR IMPROVING THE BRAND'S PERFORMANCE

RELATED APPLICATIONS

This application claims priority from U.S. Provisional application No. 62/437,342 filed on Dec. 21, 2016, the disclosure of which is incorporated herein by reference in its entirety.

BACKGROUND

(a) Field

The subject matter disclosed generally relates to the field of marketing functions and methodology and more particularly to marketing metrics and software implementations and tools that allow for measuring and improving the performance of a brand as it relates to peer-to-peer word-of-mouth, recommending, and sharing.

(b) Related Prior Art

Corporations spend thousands to millions of dollars every year on marketing for maintaining and improving their positions in their respective markets and for improving the reputation and performance of their brand.

No systems exist which allow a corporation to determine the social/conversation performance and power of their brand (or the brands of their competitors) and/or predict their future sales, in order to improve/adjust their marketing campaigns and make informed decisions with respect to social/conversation marketing/branding. In addition, social marketing processes and their results have typically been considered difficult to measure especially that no standardization of social marketing metrics currently exists. In other words, there is no clear indication to the brand owner whether or not the measured social data will have an impact on business performance, or will be comparable to the metrics measured for others in the same industry.

The majority of social marketing and campaigns are currently being done online on the social media. However, the collective data about a brand is never found assembled and ready to use in a manner that allows for a comprehensive review and analysis of the overall reputation of the brand and the overall sentiment about the brand. Instead, the online data is scattered across different dimensions including but not limited to: different social media platforms and the different webpages; different time periods; different languages; different countries/geographical locations; different ethnicities and ethnic groups etc. The impact of marketing on offline consumer conversations is rarely measured by any means. The impact of marketing on social media conversations is frequently measured, but not with a comprehensive approach that is readily comparable across many brands in the same industry, or across brands in different industries.

Furthermore, even if the online data was in fact readily assembled and available for review, this data alone is not sufficient to reflect the real sentiment/opinion/reputation about the brand in a manner that allows the brand owner to make informed decisions or even see the entire truth. The most controversial comments/posts are usually the ones that get the most traction on social media, and more often than not, people post comments about a topic just to get a reaction or to promote a self-"image" of themselves, or to blend in with their social media followers, when their actual views/actions/spending may differ from what they actually write. Numerous examples exist.

As a first example, take the fast food chain Chick-fil-A®. In 2012, comments were made by its chief executive which prompted a social media campaign to boycott the fast food chain. But in reality, sales surged 12 percent that year.

Another example, is the Wendy®'s fast food chain which, when it started its "fresh, never frozen beef" campaign, the campaign generated positive buzz on the internet but failed to stimulate sales. When offline surveys were done, the company found that most people just didn't care about the campaign because they freeze their own beef at home.

Numerous other examples exist which prove that, in addition to being scattered all over the net, online data alone can be misleading and does not allow brand owners to make fully informed decisions.

Accordingly, there is a need for a system and method which is able to perform a comprehensive data analysis that allows to determine the real sentiment about the brand and that accurately predicts its future performance, based on conversations happening in online social media and in face-to-face or other offline conversations.

SUMMARY

The present embodiments describe such system.

Generally, there is described a system and method which allow to determine the performance of a brand and/or recommend actions to improve this performance. This allows brand owners to lower spending on other forms of marketing, advertising and other indirectly related areas such as customer service, innovation and sales through increased efficiency and amplification through word-of-mouth and sharing. A study made by the Applicant shows that online and offline conversations have an important impact on the success of brands in the marketplace. Social media is a valuable tool for detecting signs of success or trouble, but a brand needs to dig deeper to see if the offline chatter matches the online one and, if not, then find out why.

In a non-limiting example, a computer implemented method is described which includes the steps of extracting, smoothing, and scoring brand related data from online social media based on correlation to business outcome/sales data; obtaining offline conversation data pertaining to all leading brands through a continuously fielded survey instrument in which respondents report recent conversations about brands, including positive or negative sentiment of those conversations; classifying online and offline data elements into sub metrics such as volume, net sentiment, brand sharing, and influence using a proprietary algorithm; and processing the aggregated data to extract a set of online metrics representing an online performance of the brand, and a set of offline metrics representing an offline performance of the brand.

Therefore, the embodiments measure the performance of the brand online and offline across multiple dimensions in order to obtain a collective amount of data that allows for performing a comprehensive review and analysis of the power of the brand and its performance to allow the brand owners to make informed strategic decisions.

In one aspect there is provided a computer implemented method for measuring a performance of a given brand, the method comprising: obtaining online conversation data representing activity data pertaining to a plurality of leading brands on one or more social media platforms, and factual data representing business outcomes for each brand; obtaining offline conversation data pertaining to the plurality of leading brands using a survey instrument in which respondents report recent conversations about the brands; processing, indexing and cross-referencing the online data and the offline data for identifying and aggregating data entries pertaining to the given brand, thus producing aggregated data pertaining to the brand; using a proprietary algorithm, processing the aggregated data to extract a set of online metrics representing an online performance of the brand, and a set of offline metrics representing an offline performance of the brand; computing for each metric a moving average formula to produce transformed metrics having values that correlate the most with the factual data of the brands, the moving average formula being a function of time and being configured to produce different values at different execution times; computing a set of first coefficients to the transformed metrics, the first set of coefficients being computed so that their corresponding transformed metric values can correlate the most with the factual data; using the transformed metrics and their associated coefficients calculating a total score representing the performance of the given brand.

The method may further include: receiving raw data of external factors/events affecting conversations about brands; simulating how a factor/event would affect metrics and scores, based on historical data on similar factors/events; and determining an impact of the external factor on one or more of: a future performance of the given brand, the online data of the given brand and the offline data of the given brand.

In an embodiment the moving average formula may be selected as follows:

$$Metric\_VA = Metric\_t1 * c1 + Metric\_t2 * c2 \ldots + Metric\_tn * cn;$$

where:

Metric_VA represents the metric with moving average;

Metric_t1-Metric_tn represent the metric as calculated over different time periods (t1-tn); and c1-cn represent a second set of coefficients that are calculated to ensure a maximal correlation with the factual data.

The factual data may represent one or more of: sales, share price, and business outcome of the given brand.

The method may also include accessing first party client data representing key performance metrics including one or more of: sales data, ads spending data, retail activity, and web traffic; and using the key performance metrics to predict future sales based on historical correlation between sales and one or more key performance metrics.

The method may also include analyzing the metric values of the brand and comparing them to metric values of successful brands; and in view of the comparison proposing one or more actions for improving the performance of the brand.

In an embodiment, obtaining offline conversation comprises associating a positive, a negative or an indifferent sentiment with the recent conversations about the brands.

In another aspect there is provided, a computer-implemented system having a processor and a memory having stored thereon computer readable statements and instructions for measuring a performance of a given brand, the system comprising: A data collection module configured for obtaining online conversation data representing activity data pertaining to a plurality of leading brands on one or more social media platforms, and factual data representing business outcomes for each brand; obtaining offline conversation data pertaining to the plurality of leading brands using a survey instrument in which respondents report recent conversations about the brands; and processing, indexing and cross-referencing the online data and the offline data for identifying and aggregating data entries pertaining to the given brand, thus producing aggregated data pertaining to the brand.

The system may also include an intelligence configured for: processing the aggregated data to extract a set of online metrics representing an online performance of the brand, and a set of offline metrics representing an offline performance of the brand; computing for each metric a moving average formula to produce transformed metrics having values that correlate the most with the factual data of the brands, the moving average formula being a function of time and being configured to produce different values at different execution times; computing a set of first coefficients to the transformed metrics, the first set of coefficients being computed so that their corresponding transformed metric values can correlate the most with the factual data; and calculating a total score representing the performance of the given brand using the transformed metrics and their associated coefficients.

In a further aspect, there is provided a computer implemented method for measuring performance metrics representative of a performance of a given brand, the method comprising: obtaining online conversation data representing activity data pertaining to a plurality of leading brands on one or more social media platforms, and factual data representing business outcomes for each brand; obtaining offline conversation data pertaining to the plurality of leading brands using a survey instrument in which respondents report recent conversations about the brands; processing, indexing and cross-referencing the online data and the offline data for identifying and aggregating data entries pertaining to the given brand, thus producing aggregated data pertaining to the brand; using a proprietary algorithm, processing the aggregated data to extract a set of online metrics representing an online performance of the brand, and a set of offline metrics representing an offline performance of the brand; computing for each metric a moving average formula specific to that metric, the moving average formula being a function of time and being configured to produce different values at different execution times, the moving average formula being computed so that the metric values produced by the formula correlate the most with the factual data of the brands; and calculating the metric values associated with the online metrics and the offline metrics using the computed moving average formula associated with each metric.

In yet a further aspect, there is provided a computer-implemented system having a processor and a memory having stored thereon computer readable statements and instructions for measuring performance metrics representative of a performance of a given, the system comprising a data collection module configured for: obtaining online conversation data representing activity data pertaining to a plurality of leading brands on one or more social media platforms, and factual data representing business outcomes for each brand; obtaining offline conversation data pertaining to the plurality of leading brands using a survey instrument in which respondents report recent conversations about the brands; and processing, indexing and cross-referencing the online data and the offline data for identifying and aggregating data entries pertaining to the given brand, thus producing aggregated data pertaining to the brand. The system also comprises an intelligence configured for: processing the aggregated data to extract a set of online metrics representing an online performance of the brand, and a set of offline metrics representing an offline performance of the brand; computing for each metric a moving average formula specific to that metric, the moving average formula being a function of time and being configured to produce different values at different execution times, the moving average formula being computed so that the metric values produced by the formula correlate the most with the factual data of the brands; and calculating the metric values associated with the online metrics and the offline metrics using the computed moving average formula associated with each metric.

In another embodiment, there is provided a system and method which predict the future performance of a brand.

In the following description, a user may be interpreted as an individual or an entity that includes more than one person such as a company, brand, firm or the like.

It is to be noted that the embodiments use the factual data (sales and business outcome data) used for the continuous improvement of the scoring algorithm (moving averages and intermediary scores weightings) is based on general sales data estimates that can be obtained/purchased from data resellers. The exercise of finding the best correlation is done for each brand, and then averaged across all brands. It is necessary that all brands in the benchmark base use the same weights and moving averages, as the transformed metric is then compared and benchmarked with other brands to compute the score. Therefore, the transformed metric is calculated the same way for all brands in the benchmark base. When it comes to predicting sales and performance, the embodiments make use of sales data pertaining to the specific brand to build a model allowing to predict it.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 2 illustrates an example of a table showing different moving average formulas for each one of the different metrics across different geographical locations;

FIG. 3 illustrates an example of a table showing different weights associated with different the transformed metrics of FIG. 2;

It will be noted that throughout the appended drawings, like features are identified by like reference numerals.

DETAILED DESCRIPTION

According to an embodiment, there is provided a method for measuring the performance of a brand and its competitors across online and offline consumer conversations. The method comprising obtaining statistical data of online and offline consumer conversations; processing the statistical data to determine key performance indicators in the form of a score and sub-scores; comparing these scores to those of other brands, both within the same industry and in other industries; and providing constant historical access to those scores in near-real time. In an embodiment, the method may further comprise analyzing the statistical data; and proposing one or more actions to the user for improving the brand's score.

Figure 1:
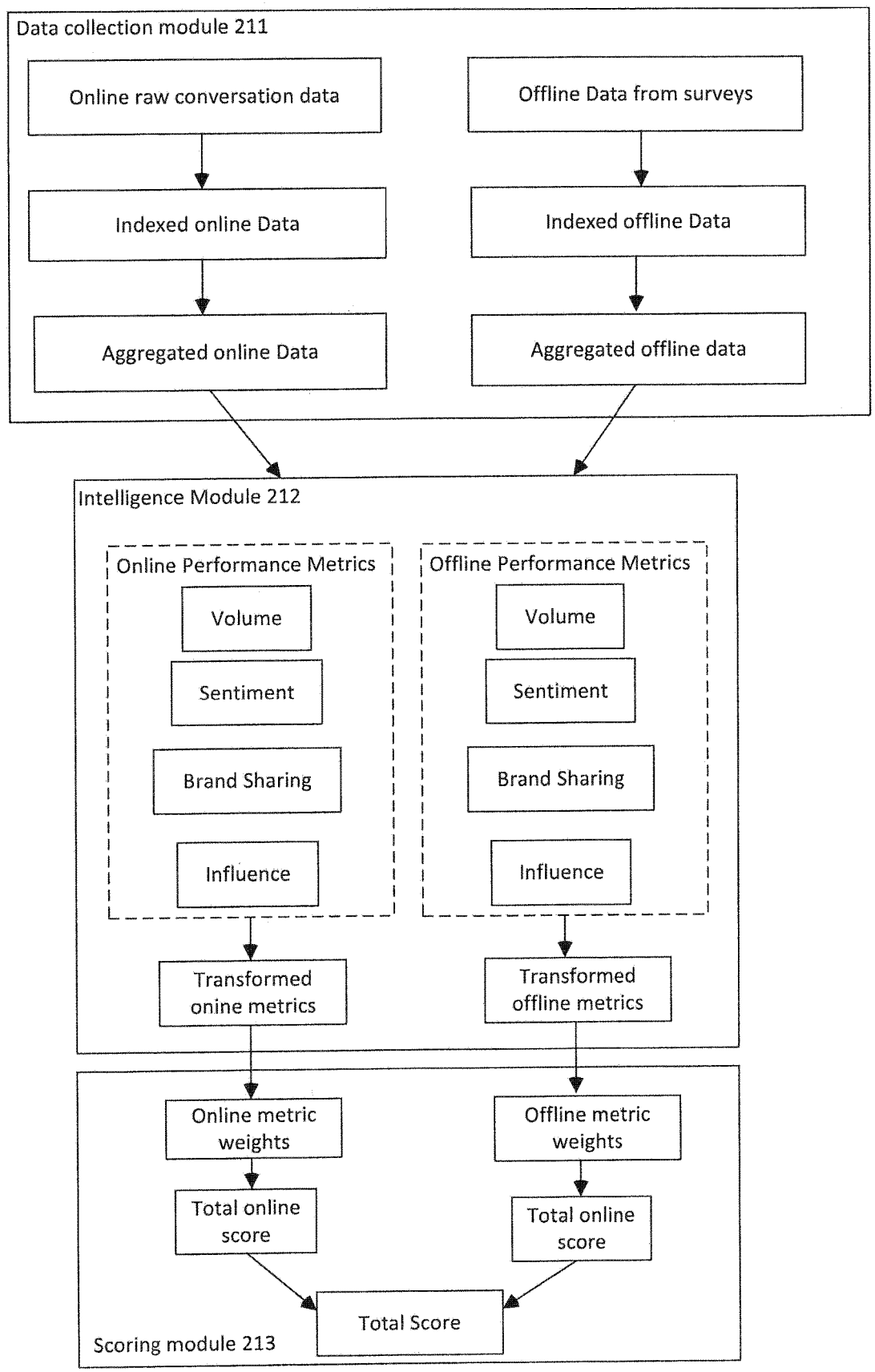
FIG. 1 is an example of an overall block diagram illustrating the data flow in a system in accordance with an embodiment.

Referring to FIG. 1, there is shown an example of an overall block diagram illustrating the data flow in a system in accordance with an embodiment.

As shown in FIG. 1, a data collection module 211 collects online and offline data pertaining to leading brands that are subscribers of the system, and other leading brands that are not, in order to analyze the general performance of all brands and to correlate the performance of these brands and their sales to external events such as news, natural and economic crisis etc. in order to determine the general impact of such events on the performance of the brands in order to improve the calculations done by the system to make them correlate to facts/business outcomes. The data for all the brands is also used to benchmark the performance of the brands that are subscribers of the system to other brands in the same industry (e.g. the competitors) as well as other non-related brands in the market for comparison purposes.

The online data is processed and indexed to find cross references of online activity data mentioning the brand. The online data pertaining to a single brand is aggregated and stored for processing.

Offline data is also obtained using online surveys to obtain answers that directly identify the specific brands that have been talked about recently by individual consumers and whether those conversations have been positive or negative about each brand, whether they have been influenced by exposure to marketing, and other conversational dynamics relevant to the brands.

An intelligence module 212 receives the data from the data collection module and analyses the data using proprietary algorithms to extract, for each type of data (online and offline), relevant metrics that reflect the performance of the brand. In a non-limiting example of implementation, these metrics include the following four metrics listed below for each one of the online data and the offline data, thus making a total of eight metrics in accordance with a non-limiting example of implementation:

Volume: a metric that indicates how many conversations are happening about the brand;

Sentiment: a metric that determines how positive or negative is the conversation/comment/answer;

Brand sharing: a metric that measures how many shares of brand content is happening on the social media and the web in general and how often people are talking offline about a brand's marketing;

Influence: a metric that measures how much of the conversation about the brand is driven by influencers.

It is to be noted that the system is not limited to the four metrics discussed herein for online and offline data. It is also contemplated that some metrics may be removed and others may be added without departing from the scope of the invention as defined in the claims. For example, the metrics may be two, three, five, six etc. In other embodiments, the online metrics may be different than the offline metrics either by number of by type or both.

One of the problems with using raw data as it is (as collected) is the extreme volatility that will cause the results to sharply vary between a week and the other depending on the most recent activity or the lack of activity. For example, when a brand does not post on Twitter® for a week, its brand sharing score should not necessarily be 0 and then peak up next time they post something. This will give conflicting signals to brand executives about the performance of their brand. Embodiments of the invention solve this problem by rolling-up the metric values using different moving averages (MA) to compensate for the extreme volatility in raw metrics time series. On the other hand, the time period for analysis should be not extended too much to not flatten the results. Whereby, the brand owners may not realize the recent changes (which may be caused by recent events) and, subsequently, may not be able to take the necessary steps to continue what is right and stop/adjust what is wrongly done.

In order to address this problem, embodiments of the invention make use of a intelligence module 212 which is configured to obtain several metrics and determine for each metric a moving average (MA) to reduce the volatility of the results, and at the same time to correlate the metrics with real facts/business outcomes (e.g. sales/sale figures, stock price, purchase or dumping of stocks etc.) for various brands to tune up the system. The moving average for each metric is a function of time and may include a different formula that differs from the formula of other metrics. In an embodiment, each formula is set as function of different time periods where each time period has a different coefficient associated with it in order to arrive, for each metric, at the formula that makes the metric correlate the most with historical facts (such as sales).

For example, assuming that the following formula was set by the system as the optimal moving average for the volume metric: $0.2*Vt1+0.5*Vt2+0.3*Vt3$. In this formula, the Vt1 indicates the volume for a first time period e.g. last 2 weeks, and Vt2 indicates the volume for the second time period e.g. last 8 weeks, and Vt3 indicates the volume for the third time period e.g. last 12 weeks. Accordingly, the moving average for the metric Volume is calculated as follows: the volume is calculated for the past 2 weeks then multiplied by 0.2 to then be added to the volume as calculated for the past 8 weeks and multiplied by 0.5 and added to the volume as calculated for the past 12 weeks and multiplied by 0.3. Realize that as time goes by, new data arrives and is taken into consideration and some of the data that was taken into consideration will cease to be taken. This will soften the impact of volatility that is the result of varying online activities and will keep the metric aligned with facts as discussed above.

FIG. 2 illustrates an example of a table showing different moving average formulas for each one of the different metrics across different geographical locations.

It is to be noted here that, for this embodiment (generation of formulas for the moving average), the data being analyzed pertains to substantially all major brands in a given industry or all industries combined. This ensures that the parameters are tuned to follow the overall market trends, variations, and the overall correlations between sales, pertinent events and online/offline chatter. Such data may be purchased from third party providers and would include the factual data about the performance of the brands such as the sales so that the system can compute the optimal formula for each metric as discussed above.

In the following description, metrics having a moving average will be referred to as transformed metrics.

Figure 4:
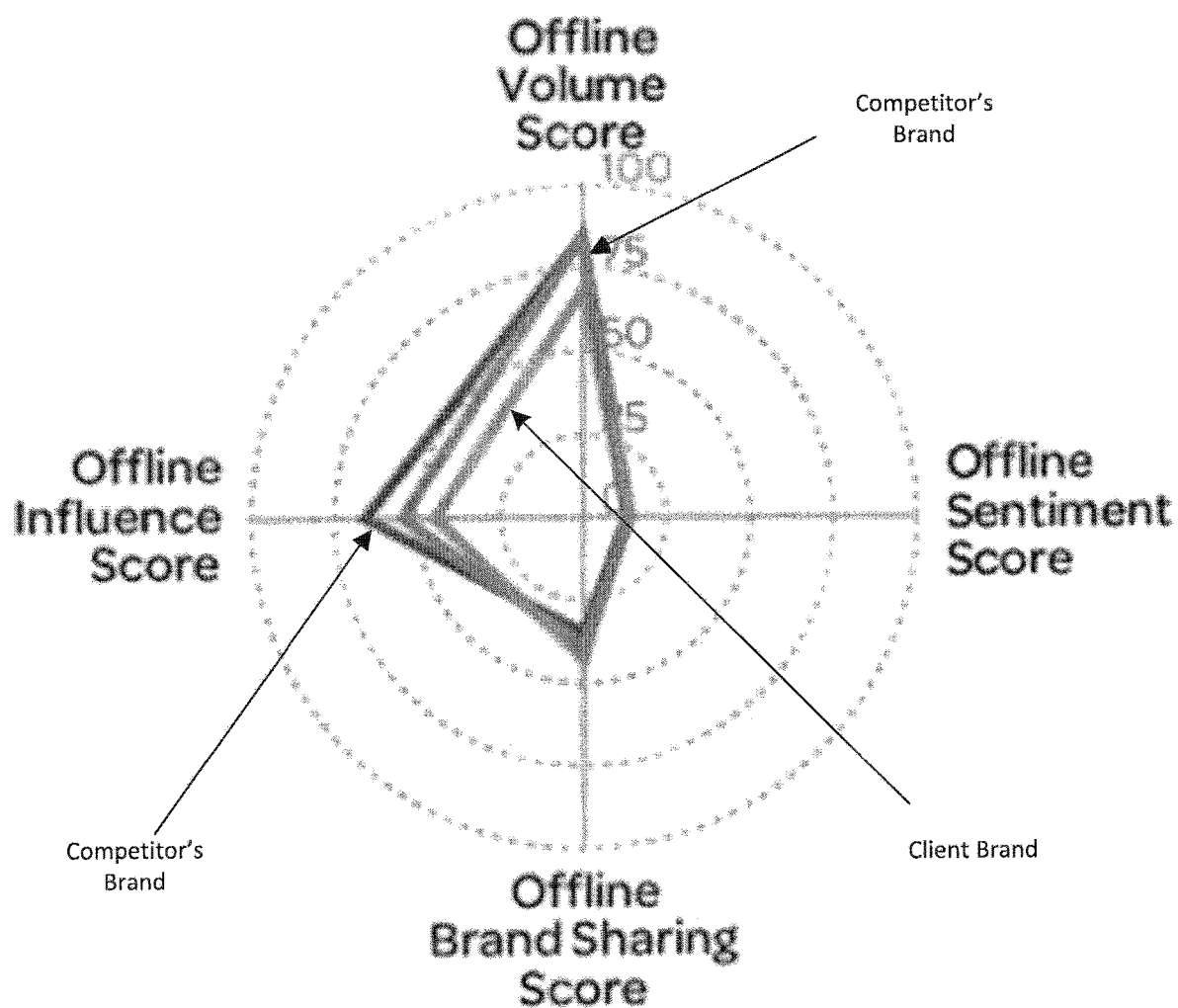
FIG. 4 shows an exemplary graph benchmarking the offline performance of a client's brand to two competitors.

A scoring module 213 obtains the eight different transformed metrics for each brand and generates a relative measure for each of them as compared to a set of other brands (benchmarking for determining the performance of the brand versus other brands). This relative measure will then be referred as 8 sub-scores. The scoring module 213 then creates a total online score and a total offline score based on the 4 online sub-scores, and the 4 offline sub-scores respectively. It does so by assigning a weight to each one of them such that the sum of all weights would amount to 1 (or 100%). Calculation of the weights is also used in a similar manner to the moving averages. FIG. 4 illustrates an example of a table showing different weights associated with different the transformed metrics of FIG. 2. This total online score and total offline score are then referred together as the intermediary scores.

The scoring module 213 may then calculate a total score based on the weight associated with each intermediary score. The total score, intermediary scores and subscores may then be displayed (or sent to the user for display). The transformed metrics may also be sent to the user for display. A benchmark between the performance of the brand and other brands in the same or different industries may also be presented as exemplified in FIG. 4 which FIG. 4 shows an exemplary graph benchmarking the offline performance of a client's brand to two competitor brands.

Figure 5:
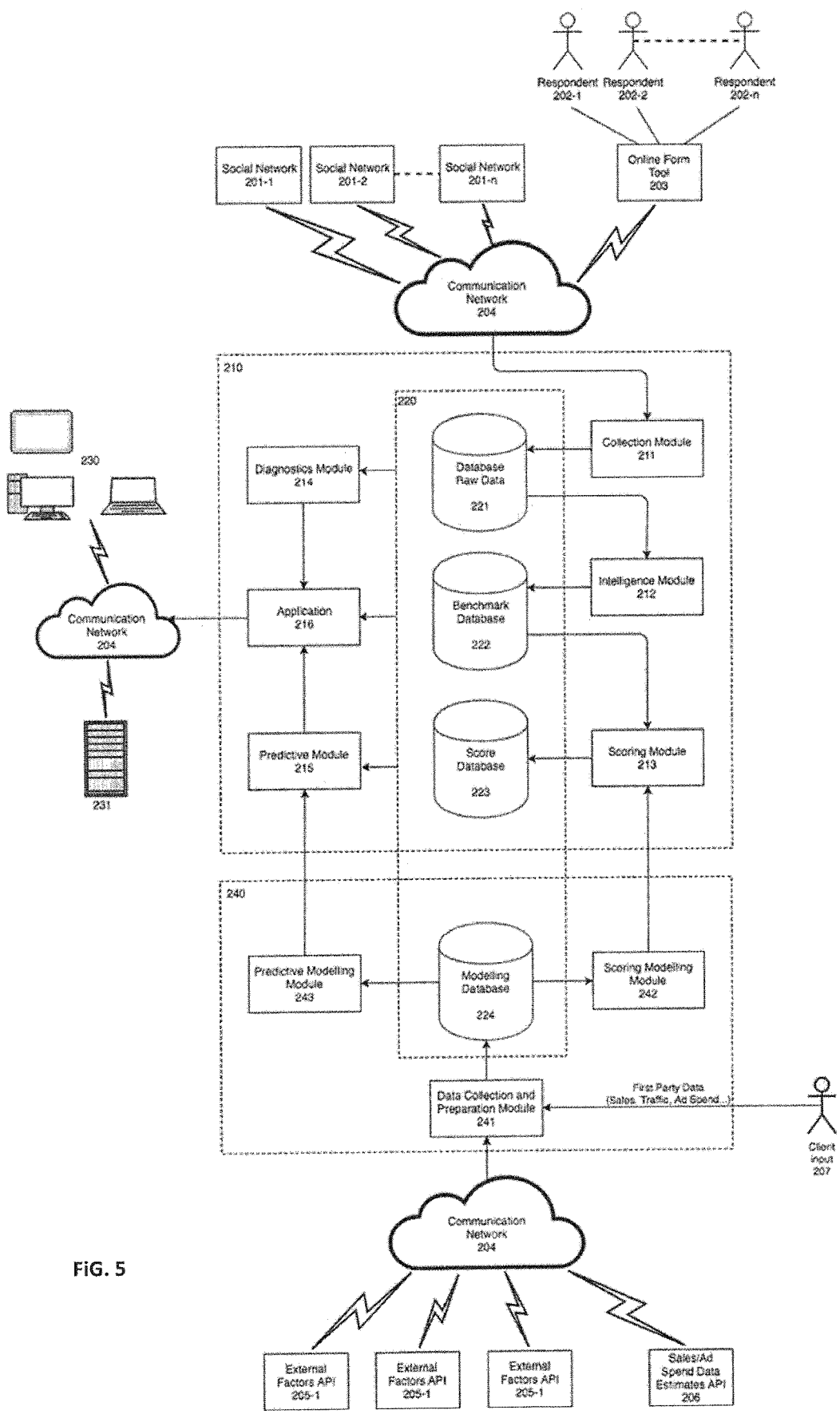
FIG. 5 is a block diagram of an exemplary system for measuring the performance of a brand and its competitors across online and offline conversations, in accordance with an embodiment.

The above embodiments will be more readily understood by referring to the following example which is given to illustrate the invention rather than to limit its scope. FIG. 5 is a block diagram of an exemplary system for measuring and improving online and offline consumer conversations, in accordance with an embodiment. The system 210 may be accessed remotely over a communication network 204 by a plurality of clients 230.

The measuring and improving of online and offline consumer conversations may be offered as a Software as Service (SaaS) in a cloud computing environment, or in a Data as a Service (DaaS) via an Application Programming Interface (API).

Obtaining Offline Conversations

In an embodiment, the data for offline "word of mouth" conversations are collected via a survey instrument. The survey instruments may be fielded among a demographically representative sample of consumers in the relevant marketplace, large enough to provide a statistically reliable measurement of conversation volume by brand. The respondents 202 may regularly fill in an online form 203 that asks them about their recent word-of-mouth conversations about brands. Statistical quotas and weights are used to insure the population is representative in terms of gender, age, region, educational attainment, and race.

The survey may ask consumers to recall conversations they have been engaged in for a recent period prior to the interview, by category and brand. The survey may collect additional information related to the personal characteristics of the respondents 202 (202-1 to 202-n), and relating to the individual conversations that occurred, in order to determine the degree to which respondents 202 have influence on other persons, and to determine the impact of exposure to marketing on such consumer word of mouth conversations that may have occurred face-to-face, over the phone, or through some private digital communications.

As the question of whether the respondent is an influencer cannot be directly asked in the survey, the system may be configured to identify influential individuals indirectly by seeking estimates of the number of people (friends, family, co-workers, neighbors, acquaintances, etc.) who they communicate with regularly, and also the product and service categories for which they are in the habit of giving advice to other people. The higher-scoring individuals based on these respondents would be considered influencers among whom brand conversation performance may be compared to other persons.

For example, to be classified as an influencer, a respondent should reply as "frequently giving advice" to:
- more than X to a question asking how many close friends they communicate fairly often with;
- more than Y to a question asking how many neighbors/acquaintances they communicate fairly often with; and
- more than Z to a question asking how many social/professional/religious group or community they belongs to.

Obtaining Online Conversations

The online data is obtained either by scraping the web and the different social media websites or by buying the data from third party providers. Whichever the source, the raw conversation data is processed, indexed and cross referenced whereby activity data relating to one or more brands (that are clients/subscribers of the system) is aggregated and stored to be used. The aggregated data for each brand is then analyzed whereby each piece of activity data is analyzed to determine the sentiment it reflects.

For example, as illustrated in FIG. 5, the system 210 may be configured to obtain raw conversational data (aka activity data) of online conversations about the user/brand from one or more social media networks 201 over a communication network 204 such as the internet, or any other type of wired and/or wireless communication networks. Examples of social media networks include but are not limited to: blogs, forums, Twitter, Facebook, Instagram, YouTube and Google related networks, customer review sites, Twitter, etc.

The data obtained from the social networks includes activity data such as posts, likes, and comments mentioning the user. The data might be obtained from the social networks themselves or from a data reseller—such as NetBase, DataSift PYLON, Gnip, etc.

As discussed above, the system 210 may also obtain raw conversational data of offline conversations about the brand from one or more survey providers over a communication network 204 such as the internet, or any other type of wired and/or wireless communication networks.

Metrics Computation

The data collected from social networks as well as the data collected from survey providers 202 by the data collection module 211 may be stored in a raw conversation database 221, part of a storage cluster 220. Using a proprietary algorithm, the intelligence module 212 computes various metrics as discussed above which as a non-limiting example include: volume, sentiment, brand sharing and influence metrics and stores them in a benchmark database 222, part of the storage cluster 220.

Moving average roll-ups may be performed using a linear model as exemplified below and as discussed in the other example above. However, the model can be much more complex:

$$\text{Value\_MA} = WT1*\text{Value\_T1} + WT2*\text{Value\_T2} + \ldots + WTN*\text{Value\_TN} \ldots$$

Where:
- Value_T1=Average metric value during timeframe 1
- WT1=Weight given to timeframe 1 as compared to other timeframes; and
- $WT1+WT2++WTN=1$ The definition and optimization of these weights and timeframes are defined below with regards to continuous improvements of the scoring system.

Online Volume Metric

The online volume metric represents how much conversation the brand user is getting through social networks, blogs and forums. It is calculated as onlineVolume=brandConversations_MA/totalConversations_MA Offline Volume Metric The offline volume metric represents an estimation of how much conversation is the brand user getting through offline word-of-mouth offlineVolume=brandConversations_MA/totalConversations_MA Online Sentiment Metric The online sentiment metrics represents how positive the conversation about a brand user is on social networks, blogs and forums. onlineSentiment=(positiveBrandConversations_MA−negativeBrandConversations_MA)/brandConversations_MA Offline Sentiment Metric The offline sentiment metrics represents how positive the conversation about a user is through offline word-of-mouth. onlineSentiment=(positiveBrandConversations_MA−negativeBrandConversations_MA)/brandConversations_MA Online Brand Sharing Metric The online brand sharing metrics represents how much sharing of content authored by the user is happening on its social media pages. Shares might be determined from various social media engagement on the user content, and may include but are not limited to Facebook shares, Twitter retweets, Youtube shares or views onlineBrandSharing=sharesOfBrandContent_MA Offline Brand Sharing Metric The offline brand sharing metrics represents how much of the user conversations are about its marketing or advertising. offlineBrandSharing=brandMarketingConversations_MA/brandConversations_MA Online Influence Metric The online influence metric represent how influential are the people engaging with the user. How influential people engaging with the brand are can be assessed by their personal authorship of content and the size of their audience (followership) on Twitter or Instagram, or by the average numbers of visitors on blogs and forums. onlineInfluence=influencerConversations_MA/brandConversations_MA Offline Influence Metric The offline influence metric represents how influential are the people talking about the user/brand, based on a consumer survey. Influence is determined based on a series of questions that estimates the size the survey respondents' real world social network and the recommending behavior of the respondent in multiple product categories. Those higher-scoring individuals are considered influencers.

offlineInfluence=influencerConversations_MA/brandConversations_MA

From each metric as described above, a scoring module 213 computes a sub-score by comparing a given metric for a certain brand against the same metric from other brands. This ensemble of other brand users is then referred to as the "benchmark base", and can consist of all brand users in the system or a predetermined subset of them. This allows for determining a sub-score thanks to a proprietary probabilistic algorithm. This sub-score per metric and per user may be a grade from 0 to 100 representing how well the user performs compared to all other known users with regards to the benchmarked metric.

In an embodiment, a proprietary probabilistic algorithm is used which uses several benchmarking methods, such as percentile (how does the user ranks compared to other users in the system: number of users performing under the user/ total number of users) and normalization (user's performance/max performance the benchmark base).

Total Online Score

From each of the online sub-scores, the scoring module 213 computes a total online score, using the following formula:

$$totalOnlineScore = a*s1 + b*s2 + c*s3 + d*s4$$

where:
a, b, c, and d represent the different coefficients associated with the different online sub-scores. These coefficients might depend on several criteria such as, but not limited to, the category or country the user is operating in.
a+b+c+d=1; and
s1, s2, s3 and s4 represent the online volume sub-score, online sentiment sub-score, online brand sharing sub-score and online influence sub-score, respectively.

Total Offline Score

In a similar fashion, from each of the offline sub-scores, the scoring module 213 computes a total offline score:

$$totalOfflineScore = A*S1 + B*S2 + C*S3 + D*S4$$

where:
A, B, C and D are the different coefficients associated with the different offline sub-scores. These coefficients might depend on several criteria such as, but not limited to, the category or country the user is operating in;
A+B+C+D=1; and
S1, S2, S3 and S4 are the offline volume sub-score, offline sentiment subscore, offline brand sharing sub-score and offline influence sub-score respectively Total Score The scoring module 213 then computes a total Value from the total Online Score and a total Offline Score.

$$totalValue = W1*TS1 + W2*TS2$$

Where:
W1 and W2 are the different coefficients associated with the total online and total offline scores respectively. These coefficients might depend on several criteria such as, but not limited to, the category or country the user is operating in;
W1+W2=1; and
TS1 and TS2 are the total online score and total offline score respectively.

The scoring module 213 would store the sub-scores and total scores discussed above in a Score Database 223, part of the database cluster 220.

As illustrated in FIG. 5, a machine learning system 240 (which may be a submodule of the system 210) is provided and may be configured via the data collection module 241 to obtain raw data of external factors that could affect conversations about brands from one or more data providers 205 as well as sales and ad spend data estimates 206 over a communication network 204 such as the internet, or any other type of wired and/or wireless communication networks. Examples of external factors include but are not limited to: economic trends, stock price, weather, news, comments made by executives and/or politicians etc—which is public data that can be obtained from various services.

Continuous Improvement of the Scoring System

The data collection module 241 may also be configured to obtain raw data of sales and ad spend estimates of brands in different industries, from data providers that may include Brand provided data, or vendors such as but not limited to Nielsen, NPD, Polk Automotive, Kantar Competitrack, ComScore, MediaMonitors, etc.

The data collected from data providers above by the data collection module 241 may be cleaned and transformed, and stored in a modelling database 224, part of a storage cluster 220. Cleaning and transformation may include but is not limited to interpolation, normalization, adjusting patterns for seasonality, logarithms, and de-trending.

For each of the 8 score metrics (online and offline: volume, sentiment, brand sharing and influence), a scoring modelling module 242 creates an alternative time series using different moving averages. For example, but not limited to:
a. 4 week moving average
b. 8 week moving average
c. 12 week moving average
d. 26 week moving average
e. 52 week moving average (offline only)

The optimal rolling average is determined by finding the combination of moving averages that maximizes the correlation of each metric to sales. The optimal weightings of each brands are then averaged to determine the final weightings.

$$Value\_MAbm = WT1bm*Value\_T1bm + WT2bm*Value\_T2bm + + WTNbm*Value\_TNbm \ldots$$

Where b=each brand; and m=each metric

The same process is repeated using methodologies other than correlation to find the alternative solutions. These include, but are not limited to, linear regression, panel regression, bayesian analytics, lasso and ridge regression, classification models and neural networks.

The system may then determine which methodologies or combination of methodologies are the best predictors of a specific key performance metric such as sales. The key performance metric is estimated for a set time-period, typically a quarter, then compared to actual values. The method(s) that predicts the best are selected.

For example, for each method estimates sales for Q4. Once actual sales are available the system identify the best performer or performers by comparing the estimated sales to the actual sales. If multiple methods produce accurate forecasts, the weights for the 8 metrics are combined to assemble the final formula.

$$Value\_Final\_MA = (WT_1*Value\_T_1) + (WT_2*Value\_T_2) + + (WT_n*Value\_Tn)$$

Where: WT is the weight applied to the value $$WT_1 + WT_2 + WT_n = 1$$

$$WT_n = \frac{(WTM_{1,n} + WTM_{2,n} + \ldots + WTM_{2,n})}{\# \text{ of methods}}$$

Where $WTM_{m,n}$ is the Weight of Timeframe n using Methodology m

Similarly, the same method is used to improve the weightings given to each subscores into the total scores. This method first calculates all subscores using the moving averages determined above and the metric definitions defined earlier.

Using the same process defined above, the system then determines for each brand which assemblage of the subscores best predict sales, using different methodologies, providing the optimal weighting for each brand. The average of the optimal weightings across all brands is then being used as the final scores weightings.

Diagnostics

The diagnostics module 214 can extract more custom insights from the raw conversations database by connecting a standard map-reduce technology to the database cluster 220. This map-reduce technology may be one of, but not limited to, Apache Spark, Hadoop Hive . . . .

The type of insights extracted might comprise, but is not limited to:

segmenting conversations by time, region, city and media;
segmenting conversations by its source age group, gender, interests or persona;
analyzing metrics and scores described above on a subset of conversations.

Predict

The data collection and preparation module 241 can also be used to obtain first party client data such as, but not limited to: sales data, ads spending data, retail activity, phone center, applications, prescriptions, web traffic or other key performance metrics. Data is cleaned and transformed using the processes detailed above so that the cleaned data gets stored in the modelling database 224 part of the database 220.

The predictive modelling module 243 is configured to determine the best model to predict or explain the first party data collected above with our key metrics and scores, using methodologies such as but not limited to simple correlation, linear regression, panel regression, bayesian analytics, lasso and ridge regression. A parameter quantifying the mathematical relationship between each of our metrics and first party data is then determined.

The model determined above is fed into the predictive module 215 which can extract trends from metrics and score described above, connecting standard machine learning technology to the database cluster 220. This machine learning technology may be one of, but not limited to, Apache M Llib, Apache Singa, Hadoop Mahout . . . .

The type of predictive insights extracted might comprise, but is not limited to:

Identifying the correlation between all of the metrics
Extracting trends of scores and metrics
Deriving the interaction of scores and metrics;
Simulating how an event would affect metrics and scores, based on historical data on similar events;
Determining the impact of online conversations on offline conversations.

The data application module 216 can serve:
raw conversation data;
sub-scores and total scores values;
sub-scores and total scores;
diagnostics insights and recommendations; and
predictive trends and simulation capabilities.

The measuring and improving online and offline consumer conversations may be offered to a plurality of users 230 (clients) as a Software as Service (SaaS) in a cloud computing environment, or in a Data as a Service (DaaS) via an Application Programming Interface (API).

Proposing Actions to Improve the Score

Recommended actions for improving online and offline consumer conversations may be provided to users based on machine learning as well as expert advice. The recommended actions typically involve actions such as modifying the allocation of media budgets to channels that are more likely to stimulate positive conversations, more directly targeting influencers who can better amplify marketing messages, and adjusting message strategies in ways that are more likely to lead to conversations, recommendations, and advocacy by consumers.

Figure 6:
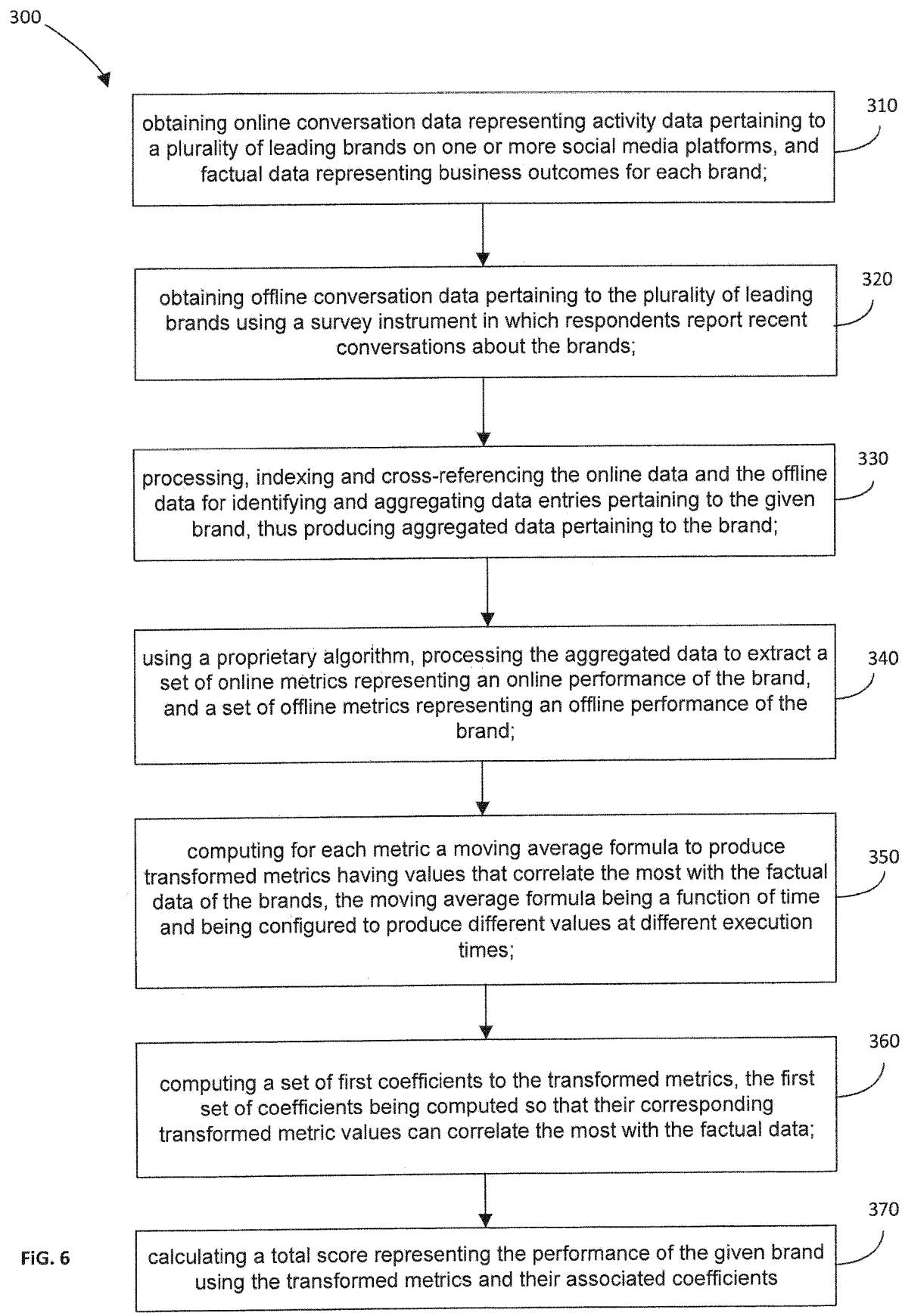
FIG. 6 is flowchart of a computer implemented method for measuring a performance of a given brand, in accordance with an embodiment.

FIG. 6 is flowchart of a computer implemented method 300 for measuring a performance of a given brand, in accordance with an embodiment. At step 310 the method comprises obtaining online conversation data representing activity data pertaining to a plurality of leading brands on one or more social media platforms, and factual data representing business outcomes for each brand. Step 320 comprises obtaining offline conversation data pertaining to the plurality of leading brands using a survey instrument in which respondents report recent conversations about the brands. Step 330 comprises processing, indexing and cross-referencing the online data and the offline data for identifying and aggregating data entries pertaining to the given brand, thus producing aggregated data pertaining to the brand. Step 340 comprises processing the aggregated data to extract a set of online metrics representing an online performance of the brand, and a set of offline metrics representing an offline performance of the brand. Step 350 comprises computing for each metric a moving average formula to produce transformed metrics having values that correlate the most with the factual data of the brands, the moving average formula being a function of time and being configured to produce different values at different execution times. Step 360 comprises computing a set of first coefficients to the transformed metrics, the first set of coefficients being computed so that their corresponding transformed metric values can correlate the most with the factual data. Step 370 comprises calculating a total score representing the performance of the given brand using the transformed metrics and their associated coefficients.

Figure 7:
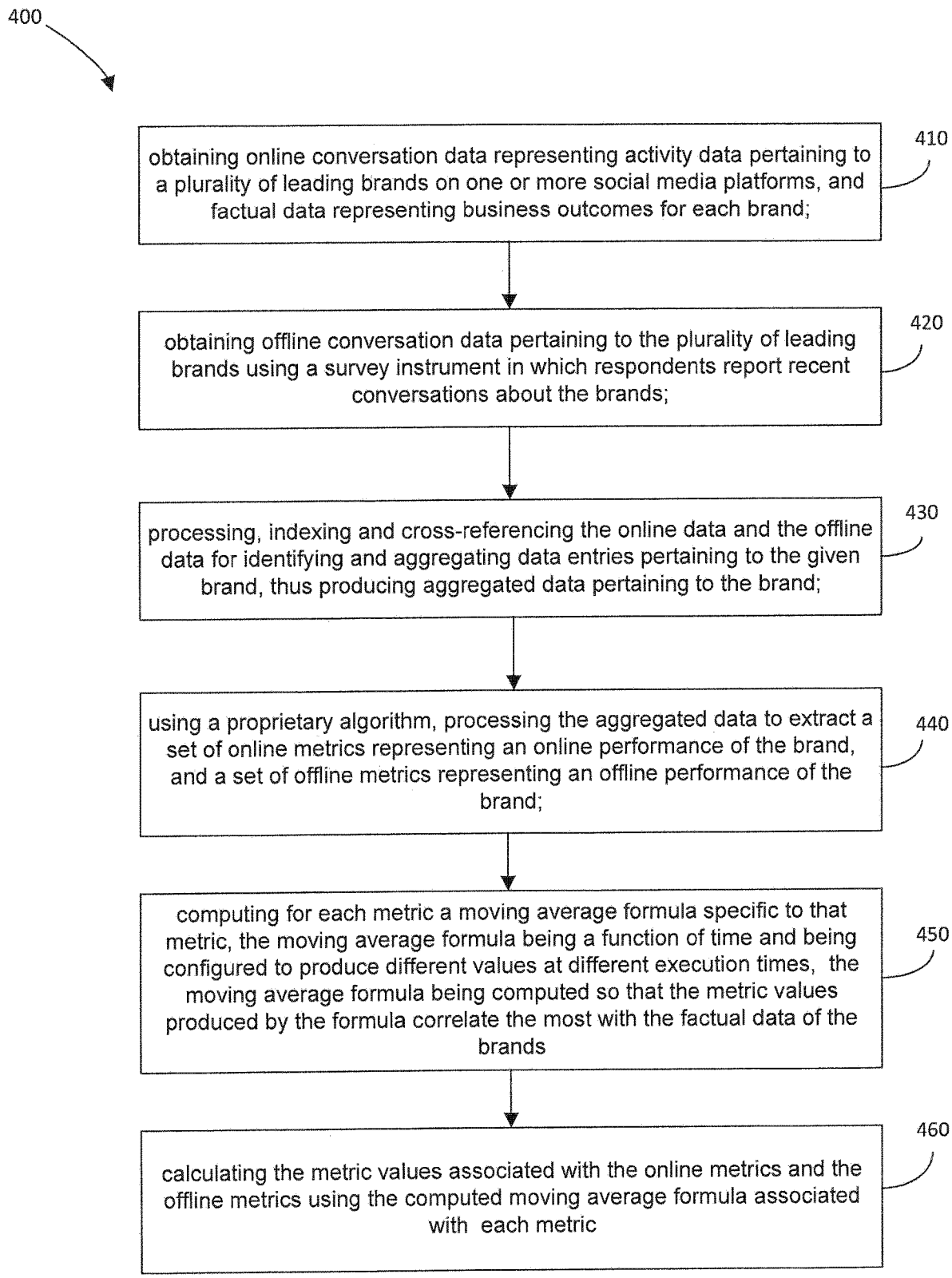
FIG. 7 is a flowchart of a computer implemented method for measuring performance metrics representative of a performance of a given brand.

FIG. 7 is flowchart of a computer implemented method 400 for measuring performance metrics representative of a performance of a given brand. At step 410 the method comprises obtaining online conversation data representing activity data pertaining to a plurality of leading brands on one or more social media platforms, and factual data representing business outcomes for each brand. Step 420 comprises obtaining offline conversation data pertaining to the plurality of leading brands using a survey instrument in which respondents report recent conversations about the brands. Step 430 comprises processing, indexing and cross-referencing the online data and the offline data for identifying and aggregating data entries pertaining to the given brand, thus producing aggregated data pertaining to the brand. Step 440 comprises processing the aggregated data to extract a set of online metrics representing an online performance of the brand, and a set of offline metrics representing an offline performance of the brand. Step 450 comprises computing for each metric a moving average formula specific to that metric, the moving average formula being a function of time and being configured to produce different values at different execution times, the moving average formula being computed so that the metric values produced by the formula correlate the most with the factual data of the brands. Step 460 comprises calculating the metric values associated with the online metrics and the offline metrics using the computed moving average formula associated with each metric.

While preferred embodiments have been described above and illustrated in the accompanying drawings, it will be evident to those skilled in the art that modifications may be made without departing from this disclosure. Such modifications are considered as possible variants comprised in the scope of the disclosure.

For example, although the system shows different modules performing different functions it is to be noted that some of the modules can be integrated within others. Similarly, while some functions seem to be performed globally by a single module, it is also to be noted that separate modules can also be used (thus dividing existing modules into more than one sub-modules).

The invention claimed is:

1. A computer implemented method for measuring a performance of a given brand, the method comprising:
retrieving, by a computer and from an online location, online conversation data representing activity data pertaining to a plurality of leading brands on one or more social media platforms, and factual data representing business outcomes for each brand;
obtaining, by the computer, offline conversation data pertaining to the plurality of leading brands using a survey instrument in which respondents report recent conversations about the brands;
by the computer, processing, indexing and cross-referencing the online data and the offline data for identifying and aggregating data entries pertaining to the given brand, thus producing aggregated data pertaining to the brand;
using a proprietary algorithm, by the computer, processing the aggregated data to extract a set of online metrics representing an online performance of the brand, and a set of offline metrics representing an offline performance of the brand;
by the computer, computing for each metric a moving average formula to produce transformed metrics having values that correlate the most with the factual data of the brands, the moving average formula being a function of time and being configured to produce different values at different execution times;
by the computer, computing a set of first coefficients to the transformed metrics, the first set of coefficients being computed so that their corresponding transformed metric values can correlate the most with the factual data of the given brand;
by the computer, using the transformed metrics and their associated coefficients calculating a total score representing the performance of the given brand; and
by the computer, using a machine learning algorithm which uses the first set of coefficients computed to correlate the most with the factual data of the given brand, to predict sales in view of future actions for the given brand.

2. The method of claim 1, further comprising:
receiving raw data of external factors/events affecting conversations about brands;
simulating how a factor/event would affect metrics and scores, based on historical data on similar factors/events;
determining an impact of the external factor on one or more of: a future performance of the given brand, the online data of the given brand and the offline data of the given brand.

3. The method of claim 1, wherein the moving average formula is selected as follows:

$$Metric\_VA = Metric\_t1*c1 + Metric\_t2*c2 \ldots + Metric\_tn*cn;$$

where:
Metric_VA represents the metric with moving average;
Metric_t1-Metric_tn represent the metric as calculated over different time periods (t1-tn); and
c1-cn represent a second set of coefficients that are calculated to ensure a maximal correlation with the factual data.

4. The method of claim 1, wherein the metrics include two or more of: volume, sentiment, brand sharing and influence.

5. The method of claim 1, wherein the factual data represents one or more of: sales, share price, and business outcome of the given brand.

6. The method of claim 1, further comprising
accessing first party client data representing key performance metrics including one or more of: sales data, ads spending data, retail activity, and web traffic; and
using the key performance metrics to predict future sales based on historical correlation between sales and one or more key performance metrics.

7. The method of claim 1, further comprising:
analysing the metric values of the brand and comparing them to metric values of successful brands; and
in view of the comparison proposing one or more actions for improving the performance of the brand.

8. The method of claim 1, wherein obtaining offline conversation comprises associating a positive, a negative or an indifferent sentiment with the recent conversations about the brands.

9. A computer-implemented system for measuring a performance of a given brand, the system comprising:
a computer having a processor and a memory having stored thereon computer readable statements and instructions for measuring the performance of the given brand, implementing a data collection module configured for:
obtaining retrieving, from an online storage location, online conversation data representing activity data pertaining to a plurality of leading brands on one or more social media platforms, and factual data representing business outcomes for each brand;
obtaining offline conversation data pertaining to the plurality of leading brands using a survey instrument in which respondents report recent conversations about the brands; and
processing, indexing and cross-referencing the online data and the offline data for identifying and aggregating data entries pertaining to the given brand, thus producing aggregated data pertaining to the brand;
the computer implementing an intelligence configured for:
processing the aggregated data to extract a set of online metrics representing an online performance of the brand, and a set of offline metrics representing an offline performance of the brand;
computing for each metric a moving average formula to produce transformed metrics having values that correlate the most with the factual data of the brands, the moving average formula being a function of time and being configured to produce different values at different execution times;

computing a set of first coefficients to the transformed metrics, the first set of coefficients being computed so that their corresponding transformed metric values can correlate the most with the factual data of the given brand; and calculating a total score representing the performance of the given brand using the transformed metrics and their associated coefficients; and using a machine learning algorithm, by the computer, which uses the first set of coefficients computed to correlate the most with the factual data of the given brand, to predict sales in view of future actions for the given brand.

10. The system of claim 9, wherein the system is further configured for:

receiving raw data of external factors/events affecting conversations about brands;

simulating how a factor/event would affect metrics and scores, based on historical data on similar factors/events; and determining an impact of the external factor on one or more of: a future performance of the given brand, the online data of the given brand and the offline data of the given brand.

11. The system of claim 9, wherein the moving average formula is selected as follows:

$$Metric\_VA = Metric\_t1*c1 + Metric\_t2*c2 \ldots + Metric\_tn*cn;$$

where:

Metric_VA represents the metric with moving average;

Metric_t1-Metric_tn represent the metric as calculated over different time periods (t1-tn); and c1-cn represent a second set of coefficients that are calculated to ensure a maximal correlation with the factual data.

12. The system of claim 9, wherein the metrics include two or more of: volume, sentiment, brand sharing and influence.

13. The system of claim 9, wherein the factual data represents one or more of: sales, share price, and business outcome of the given brand.

14. The system of claim 9, wherein the system is further configured for:

accessing first party client data representing key performance metrics including one or more of: sales data, ads spending data, retail activity, and web traffic; and using the key performance metrics to predict future sales based on historical correlation between sales and one or more key performance metrics.

15. The system of claim 9, wherein the system is further configured for:

analysing the metric values of the brand and comparing them to metric values of successful brands; and in view of the comparison proposing one or more actions for improving the performance of the brand.

16. The system of claim 9, wherein obtaining offline conversation comprises associating a positive, a negative or an indifferent sentiment with the recent conversations about the brands.

17. A computer implemented method for measuring performance metrics representative of a performance of a given brand, the method comprising:

by a computer, retrieving, from an online location, online conversation data representing activity data pertaining to a plurality of leading brands on one or more social media platforms, and factual data representing business outcomes for each brand;

by the computer, obtaining offline conversation data pertaining to the plurality of leading brands using a survey instrument in which respondents report recent conversations about the brands;

by the computer, processing, indexing and cross-referencing the online data and the offline data for identifying and aggregating data entries pertaining to the given brand, thus producing aggregated data pertaining to the brand;

by the computer, using a proprietary algorithm, processing the aggregated data to extract a set of online metrics representing an online performance of the brand, and a set of offline metrics representing an offline performance of the brand, comprising, using the proprietary algorithm by the computer, analyzing each piece of the online conversation data to have the computer classify said each piece of the online conversation data as reflecting a positive, negative or indifferent sentiment;

by the computer, computing for each metric a moving average formula specific to that metric, the moving average formula being a function of time and being configured to produce different values at different execution times, the moving average formula being computed so that the metric values produced by the formula correlate the most with the factual data of the brands; and by the computer, calculating the metric values associated with the online metrics and the offline metrics using the computed moving average formula associated with each metric.

18. The method of claim 17, wherein the moving average formula is selected as follows:

$$Metric\_VA = Metric\_t1*c1 + Metric\_t2*c2 \ldots + Metric\_tn*cn;$$

where:

Metric_VA represents the metric with moving average;

Metric_t1-Metric_tn represent the metric as calculated over different time periods (t1-tn); and c1-cn represent a second set of coefficients that are calculated to ensure a maximal correlation with the factual data.

19. A computer-implemented system for measuring performance metrics representative of a performance of a given brand, the system comprising:

a computer implementing having a processor and a memory having stored thereon computer readable statements and instructions for measuring for measuring the performance metrics, implementing a data collection module configured for:

retrieving, from an online location, online conversation data representing activity data pertaining to a plurality of leading brands on one or more social media platforms, and factual data representing business outcomes for each brand;

obtaining offline conversation data pertaining to the plurality of leading brands using a survey instrument in which respondents report recent conversations about the brands; and processing, indexing and cross-referencing the online data and the offline data for identifying and aggregating data entries pertaining to the given brand, thus producing aggregated data pertaining to the brand; and the computer implementing an intelligence configured for:

processing the aggregated data to extract a set of online metrics representing an online performance of the brand, and a set of offline metrics representing an offline performance of the brand, comprising analyzing each piece of the online conversation data by the computer to have the computer classify said each piece of the online conversation data as reflecting a positive, negative or indifferent sentiment;

computing for each metric a moving average formula specific to that metric, the moving average formula being a function of time and being configured to produce different values at different execution times, the moving average formula being computed so that the metric values produced by the formula correlate the most with the factual data of the brands; and calculating the metric values associated with the online metrics and the offline metrics using the computed moving average formula associated with each metric.

20. The computer-implemented system of claim 19, wherein the metrics include two or more of: volume, sentiment, brand sharing and influence.

* * * * *